Aug. 22, 1933.   M. WOODLEY   1,923,351
ADJUSTABLE BOOK SUPPORT AND READING STAND
Filed Dec. 29, 1931
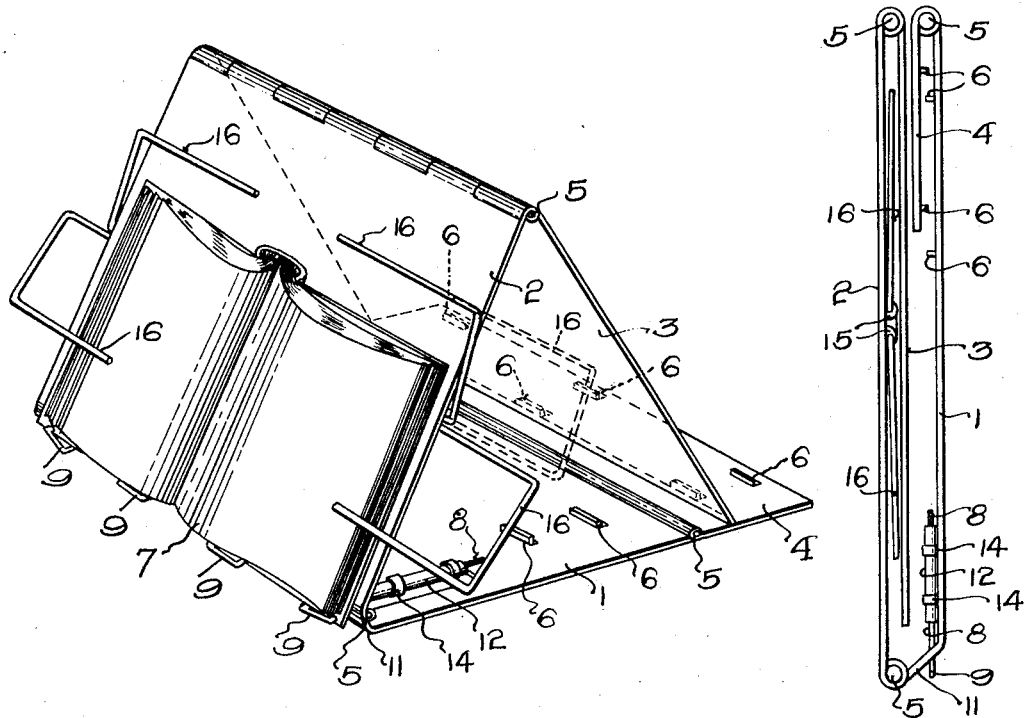
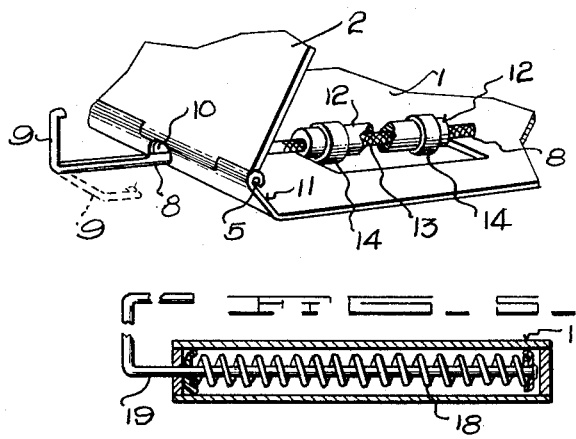
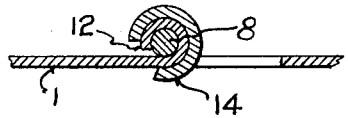
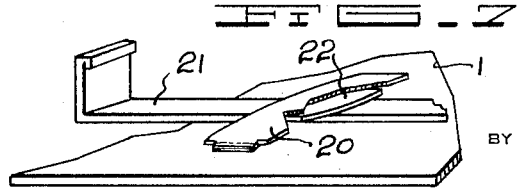
Minnie Woodley
INVENTOR
BY
ATTORNEY Patented Aug. 22, 1933

1,923,351

UNITED STATES PATENT OFFICE 1,923,351

ADJUSTABLE BOOK SUPPORT AND READING STAND

Minnie Woodley, Dallas, Tex.

Application December 29, 1931
Serial No. 583,665

3 Claims. (Cl. 45—80)

This invention relates to a combined book support and reading stand and it has particular reference to an inexpensive and convenient book support so constructed as to be readily collapsible when not in use.

The principal object of the invention is to provide an adjustable book rack or support and reading stand, the elements of which are so arranged as to allow the book to be adjusted to different angles to bring the same into the line of vision of the reader and thereby relieve any strain upon the eyes. The invention, while designed to meet all requirements of the nature above specified, is found to be quite helpful to students for copy work and for school children to enable them to sit erect and to discourage them from slumping or bending over their desks and assuming unnatural positions.

The invention further comprehends the provision of a book support of the nature specified which is adjustable to change the angular plane of a book resting thereupon and provided with appurtenances by which its width may be increased to accommodate books of different sizes and width. The invention further affords as an added object, means by which the leaves of the book may be held against accidental turning.

Additional appurtenances, which are likewise adjustable, are provided for supporting the lower edge of the book to prevent the same from slipping from its normal position on the support.

With the foregoing objects as paramount, the invention has particular reference to its salient features of construction and arrangement of parts, which will become manifest as the description proceeds, taken in connection with the accompanying drawing, wherein:—

Figure 1 is a perspective view of a book support constructed according to the present invention, on which is shown a book.

Figure 2 is a side elevation, showing the folded position of the invention.

Figure 3 is a fragmentary view of the lower front corner of the structure shown in Figure 1, illustrated in detail, one of the elements on which the lower edge of the book is supported.

Figure 4 is a detail view in perspective of the actual supporting member shown in Figure 3.

Figure 5 is a modified form of friction means for holding the supporting member shown in Figures 3 and 4.

Figure 6 is a detail view in cross section, fragmentarily showing the friction means for holding the supporting elements shown in Figures 3 and 4, and Figure 7 is a modified form of the means by which the lower edge of the book is supported on the book rest.

Continuing with a more detailed explanation of the drawing, it may be first mentioned that the improved book support is composed of three sections, that section designated by the character 1 constituting the base, the section 2 comprising the actual book rest while the section 3 supports the section 2 on the base 1. It is understood however, that the base 1 may be extended to any length desired through the provision of an extra section 4, shown in Figure 1.

The sections are hinged together at 5 in order that they may be folded into the position shown in Figure 2, which is obviously in such compact form as to enable the book support to be conveniently carried in a satchel or brief case.

A series of projections or stops 6 are struck out of the base section 1 and against which the free edge of the supporting section 3 rests when in the operative position shown in Figure 1. These projections 6 are aligned in the manner shown, along the length and width of the base section 1 and the extension section 4 in order that the supporting section 3 may be adjusted to engage the same selectively and thereby hold the foremost section 2 at any angle desired, so that the book 7 supported thereon will be accordingly moved into the line of vision of the reader.

In order to support the lower edge of the book 7, the elements shown in Figures 3 and 4 are provided and which consist of rods 8, having upturned ends 9 and which extend through apertures 10 made in the offset portion 11 of the base section 1. The opposite ends of the rods 8 are frictionally held by rolls 12, the latter being struck out of the base section 1, as shown. It will be noted in Figure 6, that the roll 12 does not form a complete circle in cross section, which fact allows for slight contraction and expansion and since the rod 8 is knurled or roughened at 13, it will remain substantially fixed in any position to which it is moved so as to allow the portion 9 of the rod to be adjusted against the margin of the back of the book and thereby hold the same securely in position as shown in Figure 1.

In order to bring about added frictonal relationship between the roll 12 and the rod 8, a metallic clip 14 encircles the roll and being of resilient material, brings about pressure on the roll 12, thereby further contracting the same against the rod 8. It will be understood that the portions 9 of the rods 8 are not ordinarily intended to engage the leaves of the book but only to hold the back of the book as shown in Figure 1 and thereby support the same securely on the section 2 of the structure.

At a point approximately midway between the upper and lower ends of the section 2, there is provided a pair of parallel rolls 15. These rolls are not shown in detail since they are identical to the rolls 12, except in the case of the modified form shown in Figure 5, which will be described presently. Rods 16, bent in substantially U-shape have one of their ends inserted into each of the four rolls 15, it being understood that there are two on either side of the section 2 of the book rack. The end of the rods so inserted into the rolls 15 are of greater length than the exposed ends thereof and are knurled or roughened in the same manner as the rods 8 previously described. Therefore, a certain amount of friction is obtained to maintain the parallel ends of the rods 16 to any position to which they may be moved.

The rods 16 are in the relationship shown in Figure 1 and serve a dual purpose, that of supporting a book of greater width than the width of the section 2 and holding the leaves of the book open. When a comparatively small book is placed on the support, such as the one shown in Figure 1, the upper rods 16 are inoperative and are shown in inoperative position in solid lines while the lower rods 16 are shown as holding the leaves of the book 7. When a book is placed upon the stand whose edges overreach the edges of the section 2 thereof, the upper rods 16 on either side of the section are moved to the dotted line position in Figure 1. This affords an auxiliary support for the overreaching edges of the book and the companion rods 16 may be employed for holding the leaves of the book.

When it is desired to fold the book support, the lower supporting members 9 are moved to lie in a plane parallel with the lower hinge 5 and the rods 16 are so adjusted that their exposed ends will lie underneath the foremost section 2 of the book rest and the sections are folded one upon the other as shown in Figure 2.

Referring to the modified form of leaf retaining means, reference is made to Figure 5 in which is shown a barrel 17, which takes the place of the rolls 15, struck out of the material of which the section 2 is composed. In the barrel 17 is an expansion spring 18 surrounding a rod 19, the exposed end of which is bent in substantially U-shape in order to serve the same purpose as the rods 16 just described. Obviously, the spring normally resists outward movement of the rod 19, thereby bringing tension upon the leaves of the book.

In Figure 7 is shown a modified form of the supporting members 9 which engage and hold the margin of the cover of the book. The modified form shown is comprised of a strip of material 20 under which is a leaf spring 22. The ends of the strip 20 pass through the base section 1 and are thereby held. A slide 21, comprised of a strip of material of greater length than width, passes under the spring 22 and is thus frictionally held in any position to which it may be adjusted.

One end of the strip 21 is turned upwardly as shown and functions to engage the lower edge of the cover of the book in the same manner as the members 9 shown in Figure 1.

It will be understood that the invention can be constructed of material such as pressed cardboard, suitably covered; wood or metal and further, it will be understood that the invention is not limited to the specific construction and arrangement of parts shown and described and that certain modifications may be resorted to without departing from the spirit or intent of the invention.

What is claimed is:

1. A combined book support and reading stand including a multiplicity of foldable sections, two of said sections comprising a base having a series of aligned projections thereon and against which another of said sections rests, and means carried by said base section for supporting the lower edge of a book.

2. A combined book support and reading stand including two pairs of sections foldable one upon another, one pair of said sections comprising a base having a series of aligned projections thereon against which the lower edge of one of another pair of said sections rests in inverted V position, and means carried by one of said sections for supporting the lower edge of a book.

3. A combined book support and reading stand including two pairs of sections foldable one upon another, one pair of said sections comprising a base having projections thereon and against which one of another pair of said sections rests adjustably in inverted V position, means for engaging the lower edge of a book cover to hold the same on one of said latter sections and means for holding said latter means in adjusted position.

MINNIE WOODLEY.